United States Patent
Harsch

[11] 3,785,721
[45] Jan. 15, 1974

[54] DISPLAY DEVICES UTILIZING LIQUID CRYSTAL LIGHT MODULATION WITH VARYING COLORS

[75] Inventor: Thomas B. Harsch, Stow, Ohio

[73] Assignee: International Liquid Xtal Company, Cleveland, Ohio

[22] Filed: July 15, 1971

[21] Appl. No.: 162,833

[52] U.S. Cl. ...... 350/150, 350/160 LC, 178/5.4 BD
[51] Int. Cl. .................................................. G02f 1/16
[58] Field of Search...................... 350/150, 160 LC

[56] References Cited
UNITED STATES PATENTS

| | | | |
|---|---|---|---|
| 3,694,053 | 9/1972 | Kahn | 350/150 |
| 3,551,026 | 12/1970 | Heilmeier | 350/150 |
| 3,544,659 | 3/1951 | Dreyer | 350/148 |
| 3,627,408 | 12/1971 | Fergason | 350/160 X |
| 3,625,591 | 12/1971 | Freiser et al. | 350/150 |
| 3,656,834 | 4/1972 | Haller et al. | 350/150 |

Primary Examiner—Edward S. Bauer
Attorney—Brown, Murray, Flick & Peckham

[57] ABSTRACT

A nematic liquid crystal device which is electrically controlled in order to produce colors which can be displayed for entertainment or advertising purposes. The liquid crystal material is sandwiched between a pair of parallel transparent plates coated with transparent conducting films. The coated plates are rubbed in the same direction such that the nematic molecules align parallel to the glass surface and point in the rubbed direction. The liquid crystal sandwich structure is then placed between linear polarizers which are oriented either parallel or crossed with respect to each other and at 45° with respect to the rubbed direction. By applying an electric field across the liquid crystal material via the aforesaid transparent conducting films, the color observed through the polarizers can be made to vary, depending upon the magnitude of the electric field. Furthermore, by applying a continually varying voltage across the conducting films, the color can be made to continually vary also.

9 Claims, 7 Drawing Figures

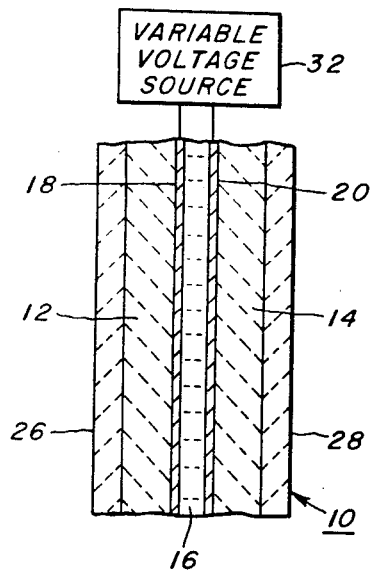
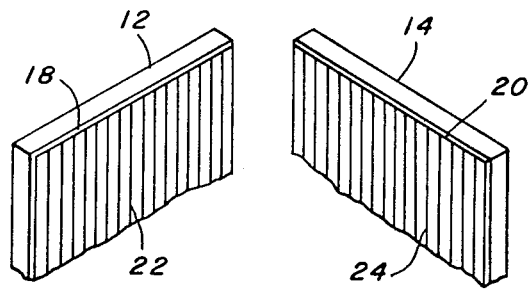
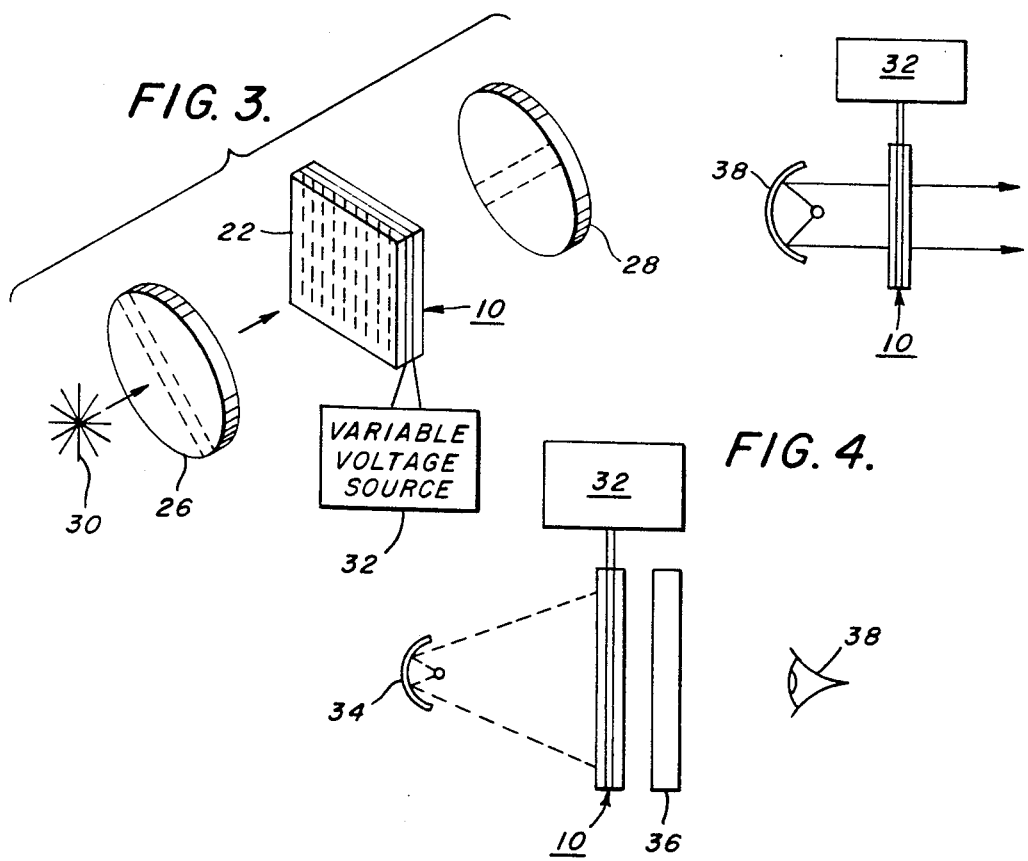

3,785,721

DISPLAY DEVICES UTILIZING LIQUID CRYSTAL LIGHT MODULATION WITH VARYING COLORS

BACKGROUND OF THE INVENTION

As is known, there are a large number of organic chemical compounds that will, within a particular temperature range, exhibit nematic-phase liquid crystals. These compounds are liquid in the sense that their molecules are not dissociated as in a gas nor so tightly bound within a structure as to constitute a solid. At the same time, they are said to be crystalline, in that there is a particular ordering to the orientation of the molecules, as is sometimes evidenced by peculiar optical effects.

It is also known that when a nematic-phase liquid crystal material is sandwiched between transparent plates that have been rubbed, each of them unidirectionally and on the surface in contact with the nematic-phase liquid crystal material, there is obtained a liquid crystal unit whose optic axis lies in the direction of unidirectional rubbing. For example, if the rubbed directions are parallel to each other, the alignment that is produced by the rubbing is such that the long axis of the nematic molecules align parallel to the glass surface and point in the rubbed direction. If the rubbed directions are placed at angles with respect to each other, the result will be an optical media which rotates the plane of polarization by an amount equal to the angle between the rubbed directions. When an electric field is applied across the liquid crystal material thus sandwiched between rubbed plates, the natural alignment of the molecules effected by the rubbing can be varied, depending upon the magnitude of the electric field.

SUMMARY OF THE INVENTION

In accordance with the present invention, a nematic-liquid crystal device is provided for producing varying colors wherein the nematic-liquid crystal is sandwiched between two sheets of transparent conductive glass each of which is rubbed in the same direction such that the liquid crystal material orients uniformly when placed between the conductive glass plates. The alignment that is produced by the rubbing is such that the long axis of the nematic molecules align parallel to the glass surface and point in the rubbed direction. The nematic-liquid crystal that is used must have a maximum dielectric constant lying along the long molecular axis. That is, the liquid crystal material must have a positive directric anisotropy.

When an electric field of increasing intensity is applied across the two plates of conductive glass, the molecules will be distorted as the field increases from their parallel position to a position where they are nearly normal to the glass plates, the instantaneous angle between the molecular axes and the final normal position depending upon the magnitude of the electric field. If the liquid crystal cell is placed between crossed linear polarizers with the rubbed direction at 45° to the preferred axes of the polarizers, with no applied field it will appear nearly white in color when viewed through one of the polarizers because of the high birefringence of the cell when the molecules are parallel to the glass surfaces. When an electric field of sufficient magnitude to cause the molecular axes to align normal to the glass plates is applied, no light will be transmitted. However, if the magnitude of the electric field is then decreased continuously from that upper value, the color of light transmitted will be first blue, then purple, green, yellow, orange, red, white and then repeat itself as the field is decreased further. When the magnitude of the electric field becomes too small, the birefringence of the sample becomes too large and the transmission colors wash out.

Hence, the electric field strength must be kept between certain critical values to produce pleasing colors. By choosing an electric field strength of sufficient predetermined magnitude, any color can be displayed. Furthermore, if a varying alternating current voltage is applied across the liquid crystal cell, the instantaneous color will change in relationship to the magnitude of the electric field applied across the cell. Therefore, it is possible in accordance with the invention to produce a time varying color with a time varying electric field. The colors can also be produced using parallel polarizers disposed at an angle of 45° with respect to the rubbed direction except that with a given field strength, the color obtained will be complementary to that obtained with cross polarizers.

The above and other objects and features of the invention will become apparent from the following detailed description taken in connection with the accompanying drawings which form a part of this specification, and in which:

FIG. 1 is a schematic cross-sectional view of a liquid crystal unit made in accordance with the present invention;

FIG. 2 is a view illustrating the manner in which the transparent plates of the liquid crystal unit of FIG. 1 are rubbed in the same direction;

FIG. 3 is a schematic illustration showing the manner in which polarized light passes through the liquid crystal unit of the invention;

FIG. 4 illustrates one manner in which the display device of the invention may be used with a ground glass or plastic screen;

FIG. 5 is an illustration of another manner in which the invention may be used to project varying colors;

Figure 6:
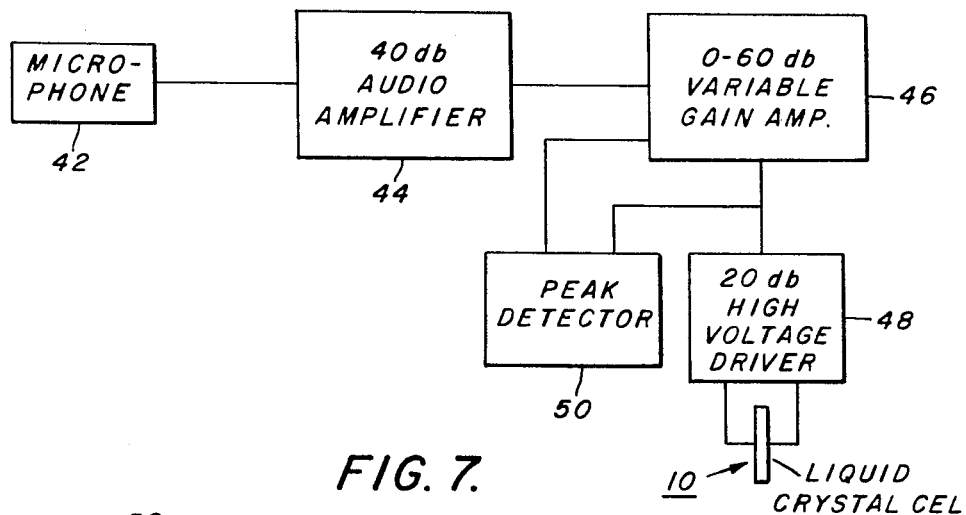
Figure 7:
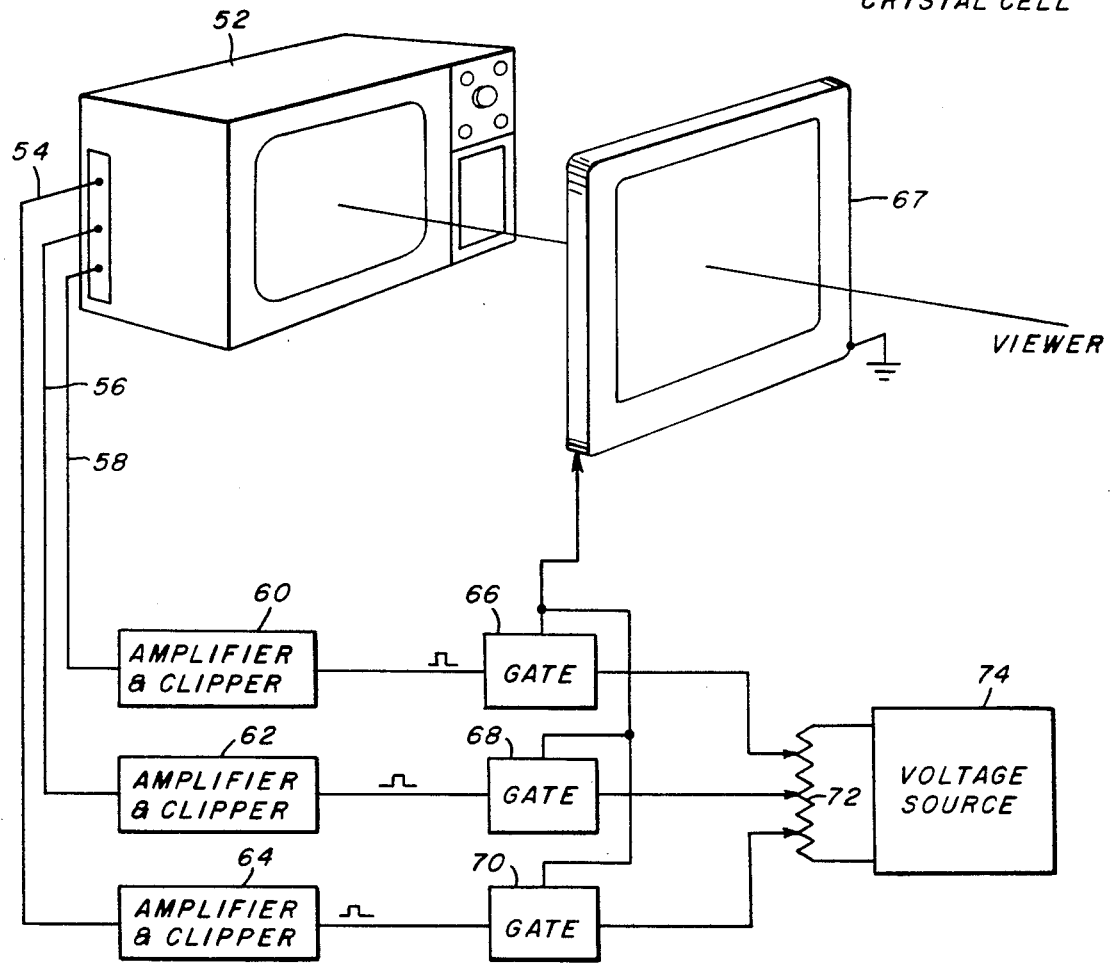

FIG. 6 is a schematic circuit diagram showing one manner in which a potential can be varied across the transparent conducting plates on opposite sides of a layer of liquid crystal material by the use of a microphone or other similar device; and FIG. 7 is a schematic illustration of the manner in which the liquid crystal unit of the invention may be utilized in accordance with the invention to convert a black and white television picture into a color picture.

With reference now to the drawings, and particularly to FIG. 1, there is shown a liquid crystal unit 10 comprising a first transparent plate 12, preferably of glass, and a second transparent plate 14, also of glass and extending parallel to the plate 12. The plates 12 and 14 are spaced apart by suitable spacers, not shown, by approximately 0.001 inch, although the spacing may be varied to suit requirements. This space is filled with a layer 16 of nematic-phase liquid crystal material with a positive dielectric anisotropy. Preferably, the liquid crystal material 16 is one comprising major portions such as 20 to 80 percent each of bis-4'-n-octyloxybenzal)-2-chlorophenylenediamine and p-methylbenzal-p'-n'butylaniline, these making up about 60 to 97 percent of the total composition and p-cyanobenzal-p'-n-butylaniline comprising the remaining 3 to 40 percent. The liquid crystal material is more particularly described in copending application Ser. No. 113,948, filed Feb. 9, 1971.

Disposed on the interior surfaces of the transparent plates 12 and 14 and in contact with the liquid crystal material 16 are coatings 18 and 20 of thin transparent electroconductive material, such as the known tin oxide or indium oxide coatings. These coatings are quite thin and highly resistive, for example, on the order of 150 ohms per unit square or above, and possibly as high as 5,000 to 10,000 ohms per unit square. It is desirable that the transparent electroconductive coating be of the kind that is applied at relatively low temperatures, such as about 500° F, by the process of cathode-sputtering in a vacuum, so that dangers of warpage may be safely avoided.

In FIG. 2, there is shown a view of the plates 12 and 14 which may comprise flat glass on the order of about 1/8 inch thick having the layers 18 and 20 of the transparent conducting material deposited on the facing surfaces thereof. In the preparation of a liquid crystal unit in accordance with the invention, the layers of transparent conducting material that are in contact with the nematic-phase liquid crystal material 16 must be prepared by being stroked or rubbed unidirectionally, with, for example, a cotton cloth. The direction of rubbing on the respective plates 12 and 14 is indicated by the lines 22 and 24 in FIG. 2; and it will be appreciated that the directions of rubbing on the respective plates are parallel to each other. The effect of this, as explained above, is to align the liquid crystal molecules such that the long axes of the molecules are parallel to the glass surface and point in the rubbed direction.

Now, if an electric field is established across the liquid crystal layer 16 by applying a potential between the conducting plates 18 and 20, the molecules tend to align with the electric field. Since the liquid crystal has a positive dielectric anisotropy, the molecules can be distorted from their parallel position to an extreme position where they are nearly normal to the glass plates, the angle between the molecular axes of the molecules and the lines 22 and 24 depending upon the magnitude of the electric field.

If the liquid crystal cell 10 is placed between crossed linear polarizers 26 and 28 as shown in FIG. 3, with the rubbed direction (i.e., the direction of lines 22 and 24) being at 45° to the preferred axes of the polarizers, then there will be maximum transmission of light through the polarizers 26 and 28. When no electric field is established across the liquid crystal layer 16, it will appear nearly white in color because of the high birefringence of the cell. At this time, the molecules are parallel to the glass surfaces and aligned with lines 22 and 24. However, when an electric field is applied of sufficient magnitude to distort the molecular axes of the molecules, light from a polychromatic source 30, when viewed after passing through the polarizers and cell 10, will change color. Furthermore, as the intensity of the electric field is increased by means of a variable voltage source 32 (also shown in FIG. 1) the colors viewed will change until the electric field reaches a point where the molecular axes of the liquid crystal molecules are normal to the glass plates. At this point, no light is transmitted.

If the electric field is now decreased in magnitude via the variable voltage source 32, the color of light transmitted decreases from a very dark blue to a very light blue, followed by magenta, yellow, green, and red. A further decrease in the field then results in the sequence of magenta, yellow, green and blue repeating itself in progressively narrower color bands until a lower minimum field is reached where the magnitude of the electric field becomes too small and the birefringence of the sample becomes too large such that the transmission colors wash out.

Referring again to FIG. 1, the polarizers 26 and 28 can be in the form of flat sheets, preferably dichroic polarizing sheets of the type manufactured by Polaroid Corporation. However, other types of polarizers may be used to suit requirements. For that matter, instead of using separate polarizing sheets or separate polarizers, the polarizers can be directly incorporated into the cell 10. In this regard, the surfaces of the conductive coatings 18 and 20, for example, can be rubbed and treated with a solution of a dye which forms a dichroic film as described in Dreyer U. S. Pat. Nos. 2,544,659; 2,524,286 and 2,400,877. Such a solution can comprise a 4% aqueous solution of methylene blue. By coating the rubbed surface of the conductive coatings 18 or 20 with this dye solution and allowing it to dry, a dichroic film will be deposited on the surface with a thickness on the order of about 1 micron. By placing the liquid crystal material as described above between the two rubbed plates treated with polarizing material, a single layer material will result which will have the complete system incorporated therein.

As a specific example, and assuming that the width of the liquid crystal layer 16 is about 1.5 mils, the voltage from source 32 applied across the cell can be increased to about 150 volts where no light is transmitted. Then, as the voltage is decreased and the electric field likewise decreased between the conducting films 18 and 20, a dark blue color exists which gradually becomes lighter as the voltage is decreased to about 50 volts. Upon further reduction in the voltage, and when the voltage reaches about 37.5 volts, the color changes to magenta and then yellow, followed by green at about 32.5 volts. At 29 volts blue again occurs, followed by magenta at 27 volts; whereupon the sequence of magenta, yellow, green and blue repeats itself with the color bands being closer and closer to each other until about 5 volts is applied across the liquid crystal cell, whereupon the colors wash out.

From the foregoing, it can be seen that a selected color can be viewed through the assembly of FIG. 1 or 3, for example, by applying a particular voltage across the liquid crystal cell. Furthermore, by applying an alternating current voltage across the transparent conducting layers 18 and 20, the colors can be made to change as the RMS value of the alternating current voltage varies. This, of course, will produce a continual change in color in what can be compared to a psychedelic effect. Preferably, the alternating current voltage applied across the cell, in the case where the liquid crystal layer is about 1.5 mils in thickness, is in the range between about 25 and 50 volts where the widest color bands occur.

One manner in which the liquid crystal cell of the invention can be used to produce an advertising display is shown in FIG. 4. Thus, the cell 10 is interposed between a polychromatic source of light 34 and a ground glass or plastic screen 36 which is viewed by the eye 38 of an observer. As the voltage from variable voltage source 32 is varied, the colors viewed on the screen 36 will also vary, producing a more or less psychedelic effect, depending upon the rate of change of the voltage. Furthermore, it will be appreciated that by changing the voltage applied to the liquid crystal cell 10 in steps, different, fixed colors can be made to appear on the ground glass screen 36 which can be over-printed with advertising material or the like.

The invention can also be used as a filter for colored illumination or spotlighting, such as illustrated in FIG. 6 wherein light from a polychromatic light source 38 is focused into a beam which passes through the liquid crystal cell 10, similar to cell 10 shown in FIG. 1. In this case, the output of the variable voltage source 32 will be varied in steps. Since the colors appear at discrete values of voltage, the color obtained can be calibrated with the applied voltage. That is, the color can be selected by setting the voltage across the cell at a given value.

Another method of producing pleasing colors and color patterns is to use convergent light for observation. If with the physical configurations described previously, highly convergent light is used for illumination, the interference pattern characteristic of a uniaxial material is observed. Since the direction of the optic axis is continually changing with the electric field variation, the interference figure changes with time. In white light the interference figure is colored and gives very interesting patterns. The convergence of the light may either be produced before or after the light passes through the liquid crystal cell. The light may be made convergent before passing through the cell by imposing a convergent lens system after the light source. Interference patterns may also be produced by placing a diverging lens system in front of the cell, thus forming a virtual image of the interference figure.

The variable voltage source 32 can be replaced by means whereby the color of the light can be made to vary in accordance with the amplitude of music, the voice, or some other transducer which produces an alternating current output. Thus, as shown in FIG. 6, a microphone 42 responsive to sound, such as music or talking, is connected through an audio amplifier 44 to a variable gain amplifier 46. The output of the variable gain amplifier is applied through a high voltage driver 48 to the liquid crystal cell 10. The output of amplifier 46 is also applied to a peak detector 50 which, in turn, controls the gain of amplifier 46. In this manner, it will be appreciated that as the amplitude of the audio signal varies, so also will the color displayed by the liquid crystal cell 10. If desired or necessary, the output of the amplifier 44 can be applied to a rectifier and the rectified audio signal applied to the liquid crystal cell. The peak detector 50 serves to regulate the gain of amplifier 46 such that the signal falls within the desired range as betwen about 25 and 50 volts in the example given above where the thickness of the liquid crystal layer is about 1.5 mils.

In FIG. 7, still another use of the invention is shown for converting a black and white television picture into a colored picture. This is applicable, for example, in color television wherein three successive frames of a television picture are scanned on red, green and blue phosphors, respectively. Thus, a black and white television receiver 52 is provided with output leads 54, 56 and 58 on which the synchronizing pulses for the red, green and blue frames appear in sequence. These synchronizing pulses, while appearing on the received television signal, will not affect the receiver 52 since it is a black and white receiver having only a single electron gun and a black and white phosphor on the face of its receiving tube. The signals on leads 54, 56 and 58 are applied through separate amplifiers and clippers 60, 62 and 64, respectively, to three gate circuits 66, 68 and 70. Also applied to the gate circuits 66, from a tap on voltage divider 72, for example, is a voltage which, when applied to a liquid crystal cell 67 similar to cell 10 shown in FIG. 1, will transmit the color blue. Similarly, the gate 68 is connected to a tap on voltage divider 72 such that the voltage applied to the gate 68 is that required to produce green with the liquid crystal cell 67; while the voltage applied to gate 70 from the voltage divider 72 is that necessary to establish an electric field across the cell 67 which will produce the color red. The voltage divider 72 is supplied by the voltage source 74, as shown.

In the operation of the system of FIG. 7, the gates 66–70 are turned ON in sequence by the synchronizing pulses at the output of circuits 60–64. As each gate is turned ON, the liquid crystal cell 66 will transmit a color determined by the voltage derived from the voltage divider 72. Thus, the colors red, green and blue will occur in sequence very rapidly, faster than the eye can follow the change, whereby a composite color picture will be produced from the three basic colors red, green and blue. The intensity of the color at any point on the picture will, of course, depend upon the intensity of the light produced at that point by the black and white receiver 52.

Although the invention has been shown in connection with certain specific embodiments, it will be readily apparent to those skilled in the art that various changes in form and arrangement of parts may be made to suit requirements without departing from the spirit and scope of the invention.

I claim as my invention:

1. In combination, a layer of nematic liquid crystal material of positive dielectric anisotrophy disposed between transparent parallel plates, said plates being coated on the surfaces thereof which face each other with films of transparent conducting material, said films of transparent conducting material being rubbed unidirectionally to provide rubbed lines with the lines on one film being parallel to those on the other whereby the long molecular axes of the liquid crysal molecules will normally align parallel to the surfaces of the plates and point in the direction of said rubbed lines, polarizers on opposite sides of said layer of liquid crystal material extending essentially parallel to said plates to provide a sandwich structure through which light can pass, and means for providing a variable electric field between said transparent conducting films whereby the color of light passing through said sandwich structure will vary depending upon the magnitude of said field.

2. The combination of claim 1 wherein said liquid crystal material comprises a mixture of 40% bis-(4-n-octyloxybenzal-2-chlorophenylenediamine and p-methylbenzal-p'-n'butylaniline, these making up about 60 to 97 percent of the total composition and p-cyanobenzal-p'-n-butylaniline comprising the remaining 3 to 40 percent.

3. The combination of claim 1 wherein said polarizers comprise polarizing sheets on the sides of said plates opposite said liquid crystal material.

4. The combination of claim 1 wherein said polarizers comprise dichroic films.

5. The combination of claim 4 wherein said dichroic films are deposited on said conducting films and are in contact with the liquid crystal material.

6. The combination of claim 1 including means for continually varying said electric field whereby the colors viewed through said sandwich structure will continually vary also.

7. The combination of claim 1 wherein said polarizers are crossed at an angle of 45° with respect to said rubbed lines on the transparent conducting films.

8. The combination of claim 1 wherein said polarizers have their major axes both extending parallel to the rubbed lines on said transparent conducting films.

9. The combination of claim 1 wherein said electric field is varied in steps.

* * * * *